Sept. 20, 1971 E. WEBER 3,605,992
APPARATUS FOR DRYING PRINTED SHEETS
Filed May 14, 1969 5 Sheets-Sheet 5
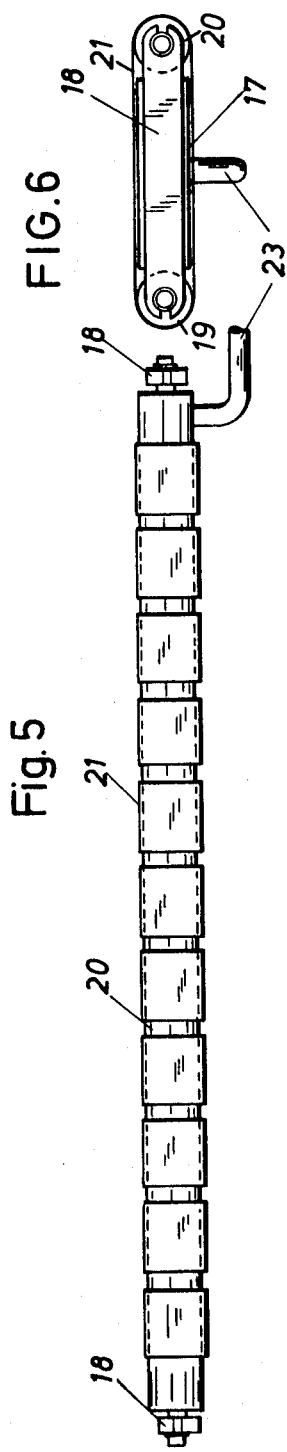
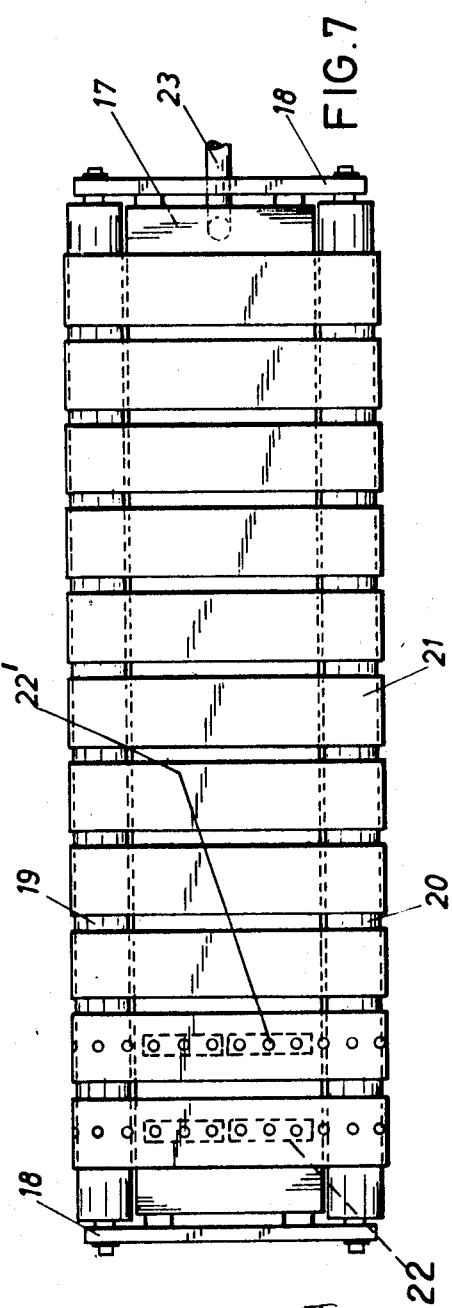
Inventor
Erich Weber
By
Watson, Cole, Grindle + Watson
Attys.

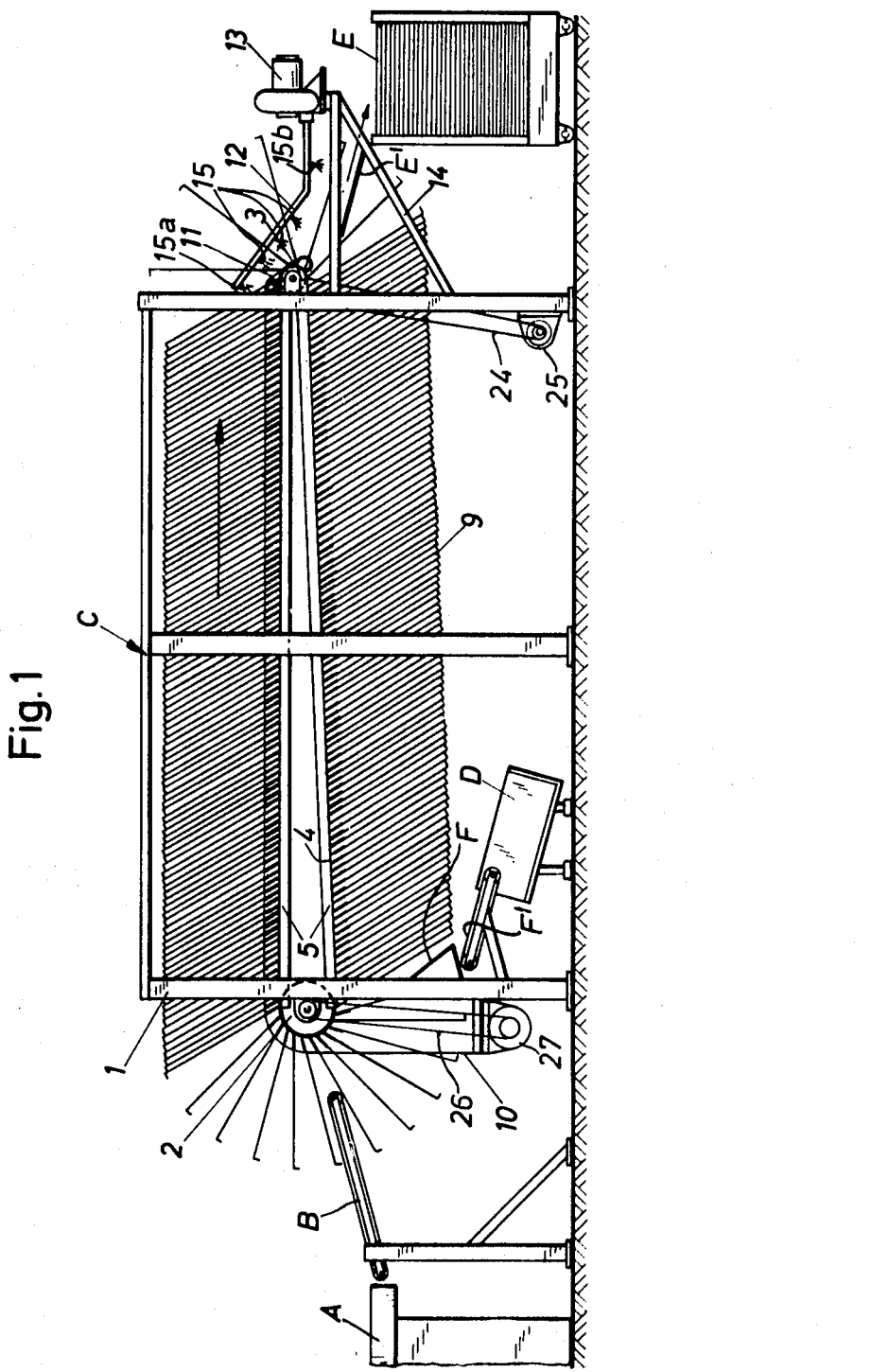

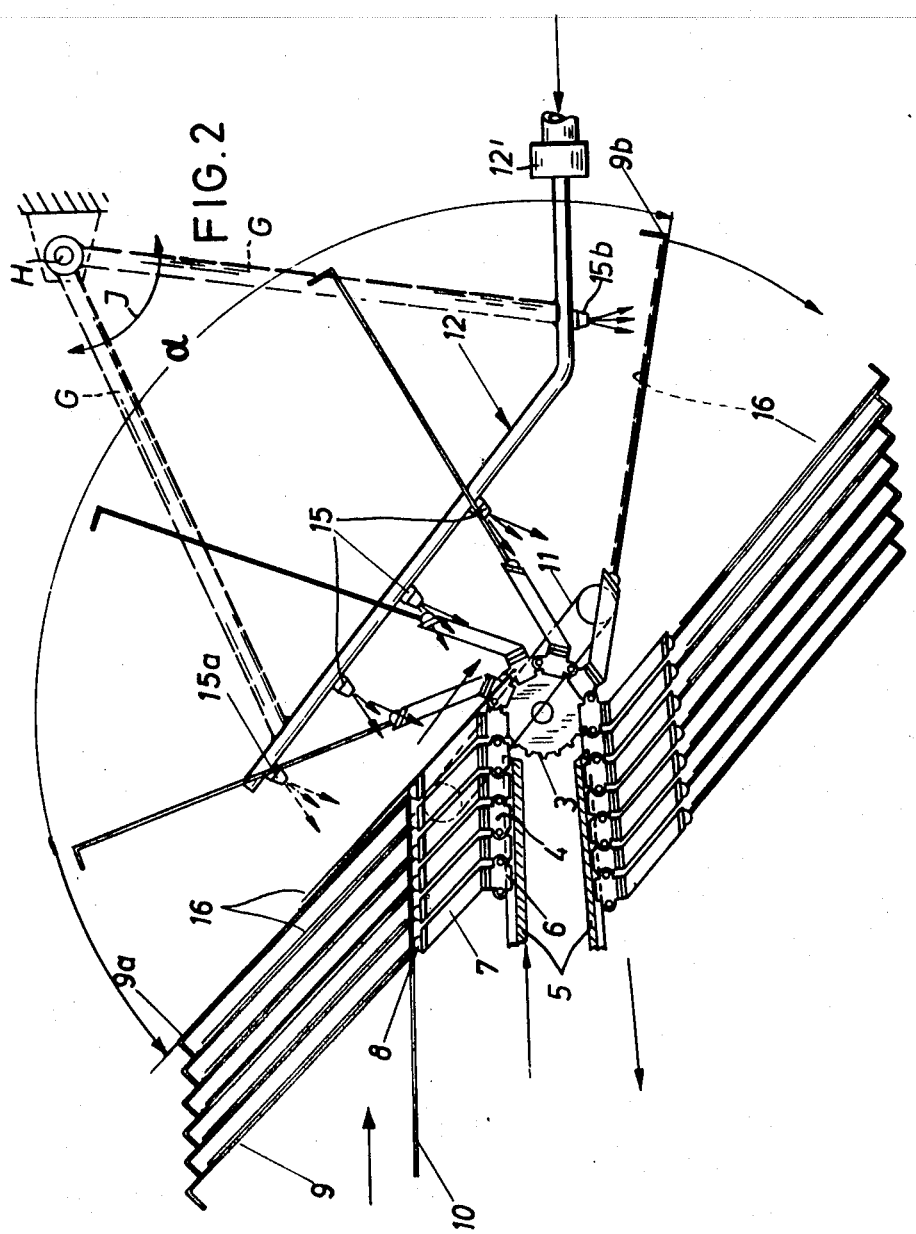

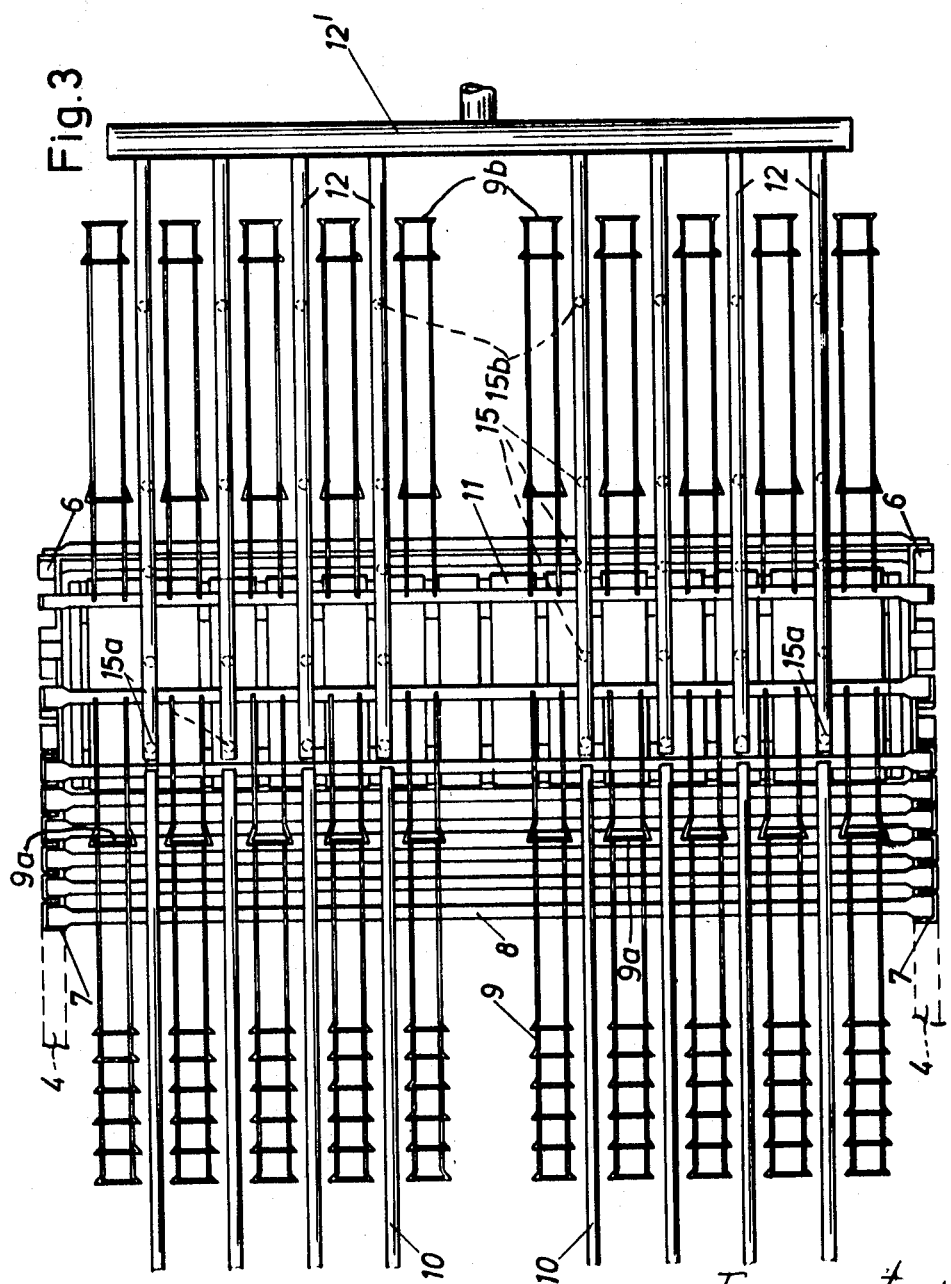

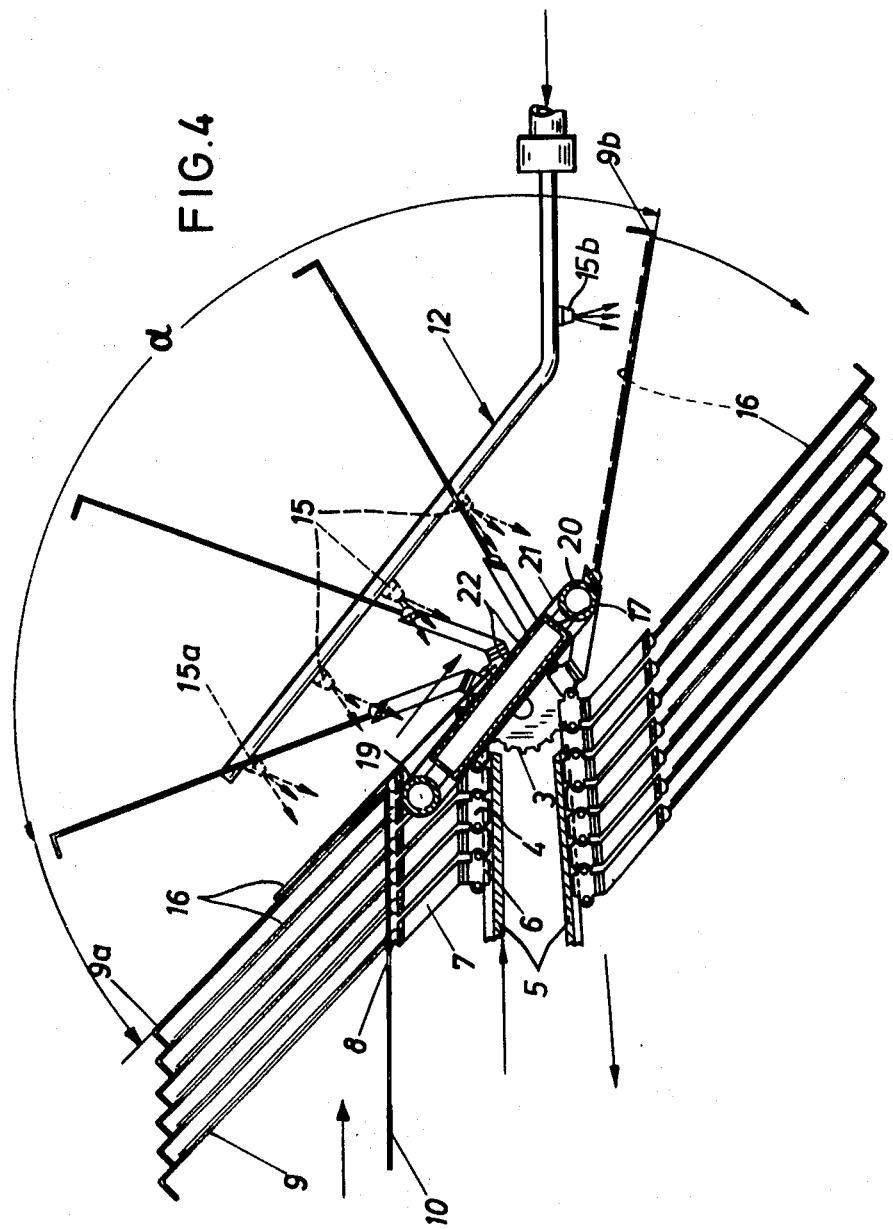

United States Patent Office 3,605,992
Patented Sept. 20, 1971

3,605,992
APPARATUS FOR DRYING PRINTED SHEETS
Erich Weber, Eichgrabenweg 2, Feldafing, Germany
Filed May 14, 1969, Ser. No. 824,521
Claims priority, application Germany, May 15, 1968,
P 17 61 401.6
Int. Cl. B65g *17/12, 17/46;* B65h *29/00*
U.S. Cl. 198—134                                    9 Claims

ABSTRACT OF THE DISCLOSURE

A printed sheet drying apparatus of the type comprising inclined carriers mounted on an endless moving chain with upper and lower runs is provided with a conveyor for controlled lowering of the sheets from the upper run to the lower run. Suction and/or blowing devices are provided for holding the sheets on the conveyor.

---

The present invention relates to apparatus for the drying of flat printed sheets, such as sheets of paper, card-board, plastic foil, sheet metal and wood. When such sheets are printed in certain forms of printing machinery, such as sieve printing machine drying may proceed comparatively slowly. In such cases, drying can be carried out while the sheets are transported with the printed sides upwards on carriers mounted on a continuously moving conveyor belt or conveyor chain. It is only after drying of the material, such as printing ink, printed on the sheets is complete that the sheet can be turned over. Since drying may take up a considerable period of time, the conveying chains or the like on which the sheet carriers are mounted often have to be made of a substantial length, and need a corresponding number of sheet carriers mounted on them in order to give the sheets sufficient time for drying. Drying devices with horizontally moving conveyor belt limbs as proposed may therefore take up a large amount of space for a given sheet drying capacity.

Forms of such drying apparatus with horizontally moving sheet carriers generally comprise a chain conveyor with conveying chains which at two horizontally spaced positions, the ends of the chain, run over sprocket wheels. The sheet carriers mounted on the chains run along an upper substantially horizontal path from a sheet loading position at one end of the chain conveyor to the other end of the conveyor at which there is the reversal point for the conveying chains. From this position the chains run back in a reverse direction along substantially horizontal return conveyor path to a position at which the printed sheets are discharged. Both along the upper and the lower paths of the conveyor the sheet carriers are held at an acute angle to the vertical. At the reversal point the printed sheets are transferred from the upper path along which the sheet carriers move to the lower path along which they move and in the lower path they rest on their printed sides. In view of this it is necessary to ensure that the sheets are dry by the time they reach the point of reversal. The consequence of this is that the drying capacity of the apparatus is comparatively low in proportion to the total travel of the sheets, that is to say firstly horizontally from the loading position to the point of reversal and then back again. It is frequently found in practice that in order to achieve a sufficient drying capacity the length of the apparatus has to be so great as to create substantial problems as regards space requirements.

One object of the invention is to avoid these disadvantages of known drying apparatus.

The present invention consists in a drying apparatus for printed sheets comprising chain means arranged to move from a sheet loading position along a substantially horizontal first path to a reversal position and then back along a substantially horizontal second, return path to the loading position, sheet carriers mounted on the chain means extending at an acute angle to the vertical along the first and second path, conveyor means at the reversal point for lowering sheets one after the other from their carriers when the latter reach a transfer position at the end of the upper, first path to a carrier extending downwards from the chain means at the beginning of the second path and pneumatic means for causing air to act upon a sheet on the conveyor for holding it on the conveyor.

The pneumatic means can be arranged to apply a gauge pressure to the upper side of a printed sheet or to apply suction to the lower sides of the sheets. It is also possible to arrange for the pneumatic means to apply a gauge pressure to the upper sides of the sheets and suction to the rear sides of the sheets.

In accordance with a particularly simple form of the invention the pneumatic means comprise a nozzle system with blowing nozzles which are arranged opposite the conveying means and are connected by pressure ducts with a blower or compressor.

In accordance with a further feature of the invention it is possible to provide additional blowing nozzles which are placed so an to be opposite the sheet carriers immediately upstream from the point of reversal in the upper or first path. Compressed air blown by these nozzles serves the purpose of holding the sheets on their carriers until they come into the transfer position for lowering onto the sheet carriers in the lower or second path.

For further features of the invention reference is made to the drawings.

An apparatus embodying the invention ensures that the printed sheets are satisfactorily transferred from sheet carriers in the upper sheet carrier path at the point of reversal to the sheet carriers in the return or second path in such a manner that the upper printed sides of the sheets remain uppermost and are not smeared by their wet printed sides coming to rest on the sheet carriers owing to the sheets being turned over as is the case with previously proposed apparatus. The length of the horizontal drying apparatus can thus be reduced to about the half of that of previously existing drying apparatuses. Furthermore there is a substantial reduction in the number of sheet carriers used. In practice this may mean that the apparatus can be built with several hundred, for example 600 to 700, less sheet carriers with a corresponding reduction in other elements of the apparatus. A practical consequence of the adoption of an apparatus in accordance with the invention is that a large capacity drying installation can be established in premises in which it was previously not possible to use a satisfactory drying apparatus. Furthermore, the production costs of the drying apparatus are substantially reduced.

The use of the pneumatic means for holding the printed sheets against the obliquely inclined sliding face or sliding conveyor ensures that the sheets are not bent or crumpled owing to an excessively high speed being reached by sheets passing from the upper path to the lower path.

Embodiments of the invention are now described with reference to the accompanying drawings.

FIG. 1 is a diagrammatic side view of a drying apparatus in accordance with the invention.

FIG. 2 shows, in a larger scale, partially in side view and partially in section the reversal position of the horizontal chain conveying means with the blowing apparatus.

FIG. 3 shows the reversal position of the chain conveyor in accordance with FIG. 2 in plan view.

FIG. 4 is a side view in partial section of the reversal point of the chain conveyor with a suction device, the view being generally similar to that of FIG. 2.

FIG. 5 shows the suction device of FIG. 4 from the front.

FIG. 6 shows the suction device in accordance with FIG. 4 from the side.

FIG. 7 shows the suction device in accordance with FIGS. 4 to 6 in plan view.

Referring now to the drawings and more particularly to FIG. 1, it should be explained as a preliminary that printed sheets pass from schematically indicated printing machine A onto a feed conveyor B which passes the sheets to the horizontally arranged chain conveyor C. The sheets can for example be sheets of paper or sheets of thicker material, having a thickness, for instance, of one or more millimeters. On the transport path in the direction of the arrow (FIG. 1) along the substantially horizontal upper path of the chain conveyor C the printed sheets are held at an acute angle tot he vertical with their printed faces uppermost. At the other, righthand end, of the apparatus there is a reversal position where the printed sheets, still with their printed surfaces uppermost, are lowered along an inclined plane onto sheet carriers passing along the lower return conveyor path. On the sheet carriers, which move in the opposite direction along the lower path the sheets are moved back to the front or first end of the drying apparatus.

In this position the sheets are completely dry and are removed from the sheet carriers by means of a rake device F and conveyed by means of a moving belt F' into a box D or onto a shaking table. It should be mentioned that in certain cases, for example when the ink on the sheets dries comparatively quickly, the sheets can be removed from the other, reversal end of the drying apparatus by means of an obliquely set rake-like sliding frame E' an dlaid so as to form a stack in a box or container E.

At the two ends of a conveyor frame 1 (see FIG. 1) sprocket wheels 2 and 3 are carried at the sides of the chain conveyor. The sprocket wheels 2 are fixed on a shaft which is journalled in the frame and extends across the whole width of the drying apparatus. The sprocket wheels 3 are journalled on the side of the frame 1 of the apparatus without the use of any such transverse shaft. Endless conveyor chains 4 run over the sprocket wheels 2 and 3 and are guided in guide rails 5 mounted in the frame 1.

On the chain links of the conveying chains 4 angle pieces 6 (see FIGS. 2 and 3) are attached together with intermediate pieces 7. Horizontal carrying tubes 8 are provided on the intermediate pieces 7 or on the angle pieces 6 which can be suitably elongated for this purpose. The carrying tubes 8 extend over the whole width of the chain conveyor. Sheet carriers 9, which correspond in size to the format of the sheets to be dried, are welded on the carrying tubes 8. The sheet carriers 9 are in the form of pieces of wire or rods with cross pieces as is shown in FIG. 3. In this manner a circulating sheet carrying system is formed with the sheet carriers 9 placed one behind the other.

In order to prevent the printed sheets falling through the spaces adjacent to the carrying tubes 8, abutment rails 10 (see more particularly FIGS. 2 and 3) are attached to the frame 1. These abutment rails are provided with an antifrictional coating so as to support the printed sheets at their bottom ends during their transport on the upper path of the conveying arrangement.

The sprocket wheels 3 are intentionally made with a small diameter and therefore a small number of teeth so as to cause the sheet carriers to fan out at the reversal position at the righthand end of the apparatus. The spreading out of the carriers and their associated parts 6 and 7 so that the pitch is increased enables the sheets to pass down easily from the top path of the drying apparatus onto the bottom path as is to be explained in more detail. The number of teeth on the sprocket wheels 3 is so chosen that the angle α between the last sheet carrier 9a of the upper path to the first sheet carrier 9b in the lower path is for example 120 to 180°.

In the space between the carrying tubes 8, an endless conveyor belt 11 is provided consisting of a number of parallel belt segments. The belt 11 is at an oblique angle plane between the carriers 9a and 9b.

At the righthand end of the apparatus there are compressed air supply tubes 12 which extend between the sheet carriers 9. These tubes are connected by means of a tube 12' with a blower or compressor 13 (FIG. 1) mounted on a bracket 14. The bracket is in turn mounted on the frame 1. The tubes 12 of this tube system are bent and are provided with nozzles 15, 15a and 15b.

The sheets 16 which are still wet after leaving the printing machine A are placed by the feed belt B on the sheet carriers 9. The latter are moved in steps or continuously to the transfer position, that is to say the position assumed by the sheet carrier 9a (FIG. 2). During this travel along the top path of the drying apparatus the lower edge of the sheet rests on the rails 10. The sheets 16 cannot immediately slide down in an uncontrolled manner from the sheet carrier in the transfer position onto the belt 11 because of the air blown from the nozzles 15a, forming the top row of nozzles, and this air stream holds the sheets against the sheet carrier 9a. Compressed air is supplied, as already mentioned, through the tubes 12 from the blower 13.

By the use of suitable control devices such as magnetically operated valves the blowing nozzles 15a in the top row are then shut off. Consequently the sheet 16 is released and slides from the carrier 9a downwards onto the conveyor belt 11. Owing to the blowing pressure of the nozzles 15 the sheet 16 is pressed against the individual belt sections of the belt 11. The nozzles 15 can be arranged to operate continuously or only to operate in intervals when the nozzles 15a are not operating. Owing to the blowing pressure the sheet 16 cannot slide down under its own weight along the inclined plane and instead is caused to move at precisely the same speed as the belt 11. That is to say there is a gentle controlled lowering of the sheet onto the sheet carrier 9b at the beginning of the return or lower path of the carriers 9. As soon as the sheet has moved downwards sufficiently to be completely clear of the sheet carrier 9a, the nozzles 15a forming the uppermost row are switched on again or opened. Consequently the sheet carried by the next carrier 9 is held until the sheet carrier takes up the position of the sheet carrier denoted by reference numeral 9a in FIG. 2. When this position has been assumed the nozzles 15a are shut off so that the sheet is lowered down onto a fresh carrier in the position denoted by 9b in the figure, by the belt 11.

The above-described manner of operation can be carried out intermittently or in steps and can also be carried out continuously.

The blowing air emerging from the blowing nozzles 15b in the lowermost row of nozzles exert a gentle pressure on the sheet 16 so as to ensure that it comes into proper engagement with the carrier in the position 9b and does not slip over the edge of the carrier. Such a slipping might be caused by the air pressure acting on the rear of the sheet. At the reversal point of the drying apparatus it is possible to use suction devices instead of nozzles fed with a gauge pressure. Such suction devices would operate on the rear surfaces of the sheets. It is also possible to use a combination of suction and blowing. Such a combined form is shown in FIGS. 4 to 7.

A hollow vacuum plenum 17 is connected with lateral carrying sheet metal supports 18. The supports 18 carry bearings for shafts 19 and 20 of the conveyor belt 21. Under sections of the belt 21 (with holes 22') the upper face of the vacuum plenum 17 is provided with suction openings 22 (FIG. 7). The plenum 17 can be connected with the suction inlet of the blower 13 (FIG. 1), for example by means of a connection 23, which is shown diagrammatically in the drawing.

In operation with such a vacuum plenum the blowing nozzles 15 of the blowing tube system 12 can be dispensed with. The nozzles 15a of the uppermost row of nozzles are preferably provided in this embodiment of the invention as well and controlled in such a manner that the sheet passes into the correct position on the conveyor belt 21 associated with the vacuum plenum 17. The suction through openings 22/22' maintain the sheet 16 snugly against the sections of the belt 21 so that the sheet is caused to be lowered at a speed equal to the peripheral speed of the belt sections and passes down onto the sheet carrier 9b. It is possible to use conveyor belt sections which are made of a material through which air can be drawn to exert a sucking effect on the sheets.

The belt 11 or 21 can be driven by means of a drive chain 24 (FIG. 1) connected with a drive motor 25. The transport chain 4 can be driven by means of a motor 27 via a drive chain 26 connected with the shaft of the sprocket wheel 2.

The nozzle system 15, 15a can also be made so that it can move, for instance to perform a tilting movement. It is also possible to arrange for it to move in a direction parallel to the plane along which the sheets are slid downwards. In FIG. 2 such an arrangement is shown in broken lines. In this device the blowing tube system 15 is carried on holding arms G which can be swung about a pivot pin H in the direction of the arrow J backwards and forwards. In this case valves or like means for shutting off the nozzles 15a in the uppermost row of nozzles are not required and the nozzles 15a can be permanently connected with the source of compressed air so as to blow continuously. The nozzles move downwards along an inclined, curved path until the nozzles 15a come to lie in front of the belt 11. Consequently the sheet 16 is released and can slide from the carrier 9a downwards onto the belt 11 which lowers or propels it onto the carrier denoted by reference numeral 9b.

It is to be understood that the invention is not limited to the particular embodiments described with reference to the accompanying drawings and includes a number of variations.

As an example of one of these possible variations it is possible to provide a roller conveyor instead of a conveyor belt 11 or 21.

In accordance with a further feature of the invention the chain means may be inclined at an angle (for example 10 to 30°) to the horizontal plane, ascending upwards from the loading end of the drying apparatus upwards to the reversal end, in order to make the angle at which the sheet carriers 9 are held to the vertical less steep.

What I claim is:

1. A drying apparatus for printed sheets comprising chain means arranged to move from a sheet loading position along a substantially horizontal first path to a reversal position and then back along a substantially horizontal second, return path to the loading position, sheet carriers mounted on the chain means extending at an acute angle to the vertical along the first and second paths, a conveyor, lying at an angle substantially parallel to said sheet carriers, disposed at the reversal point for lowering sheets successively from their carriers when the latter reach a transfer position at the end of the upper, first path to a carrier extending at an angle to said conveyor at the beginning of the second path, and pneumatic means for causing air to act upon each successive sheet during lowering, said conveyor comprising at least one endless conveyor belt section disposed for movement at a predetermined rate of speed between said first and second paths, said pneumatic means comprising a first series of air nozzles arranged for directing compressed air onto each said successive sheet during lowering against its carrier as it reaches the transfer position at the end of said first path, said pneumatic means further comprising a series of air means arranged for causing air to force each said successive sheet against said conveyor belt so as to assure that each said successive sheet is lowered at a rate equal to aid predetermined rate for said belt, and said pneumatic means still further comprising a second series of air nozzles arranged for directing compressed air onto each said successive sheet against said carrier extending at an angle to said conveyor.

2. An apparatus in accordance with claim 1 wherein said series of air means comprises a third series of air nozzles arranged to exert a blowing effect on the upper surfaces of each of said successive sheets.

3. An apparatus in accordance with claim 2 in which the apparatus further comprises a blower for supplying said first, second and third series of air nozzles.

4. An apparatus in accordance with claim 2 comprising valve means for controlling operation of said air nozzles.

5. An apparatus according to claim 1 wherein said series of air means comprises a vacuum plenum provided with suction openings, said openings being located beneath said conveyor and said at least one endless belt section being perforate to permit air to be sucked therethrough.

6. An apparatus according to claim 1 wherein means are provided for moving said pneumatic means so as to control the lowering of each of said successive sheets.

7. An apparatus according to claim 6 wherein said moving means comprise pivotally mounted holding arms for said pneumatic means.

8. An apparatus in accordance with claim 1 in which said series of air means are arranged to exert a blowing effect on the upper surfaces of each said successive sheets and to exert a suction effect on the lower surfaces of each said successive sheets.

9. An apparatus in accordance with claim 1 in which said chain means are inclined at an angle of about 10 to 30° to the horizontal ascending from the loading end to the reversal end of the drying apparatus upwards.

References Cited

UNITED STATES PATENTS

| | | | |
|---|---|---|---|
| 964,166 | 7/1910 | Klinck | 198—134X |
| 1,128,448 | 2/1915 | Hitchcock | 198—134X |
| 1,414,872 | 5/1922 | Frederick | 271—74 |
| 1,562,560 | 11/1925 | Hormel | 198—134 |
| 2,138,178 | 11/1938 | Lang | 271—74X |
| 2,299,259 | 10/1942 | Sites | 271—74 |
| 3,126,200 | 3/1964 | Rehm | 271—74X |
| 3,178,174 | 4/1965 | Schneider | 271—74X |

EVON C. BLUNK, Primary Examiner

W. S. CARSON, Assistant Examiner

U.S. Cl. X.R.

34—150; 271—63, DIG10